No. 758,663. Patented May 3, 1904.

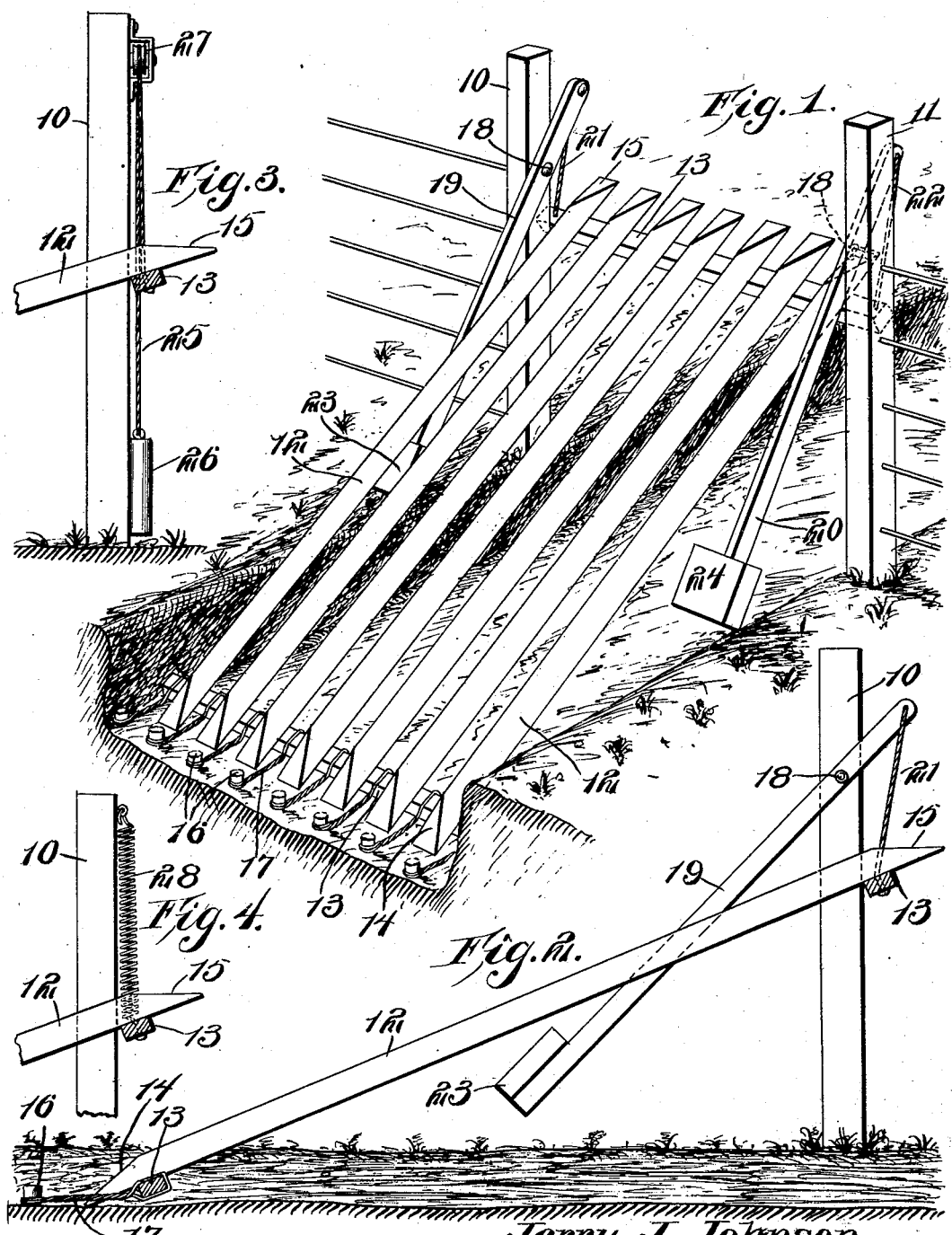

UNITED STATES PATENT OFFICE.

JERRY J. JOHNSON, OF ROSEVILLE, ILLINOIS.

FLOOD FENCE OR GATE.

SPECIFICATION forming part of Letters Patent No. 758,663, dated May 3, 1904.

Application filed November 12, 1903. Serial No. 180,942. (No model.)

*To all whom it may concern:*

Be it known that I, JERRY J. JOHNSON, a citizen of the United States, residing at Roseville, in the county of Warren and State of Illinois, have invented a new and useful Flood Fence or Gate, of which the following is a specification.

This invention relates to automatic flood fences or gates for erection where floods are liable to occur and which will afford a barrier to the passage of animals when the water is low or when no water is present, but which will yield when the water rises to a height to endanger an ordinary fence and which will return automatically to its former position when the flood subsides, and has for its object to improve the construction of such devices and produce an apparatus of this character entirely automatic in its action and which will adapt itself to the varying stages of the water and which will not be displaced by an abnormal rise of the water.

The invention consists in certain novel features of construction, as hereinafter shown and described, and specified in the claims.

In the drawings illustrative of the invention, in which corresponding parts are denoted by like designating characters, Figure 1 is a perspective view of the device complete. Fig. 2 is a transverse sectional elevation enlarged. Figs. 3 and 4 represent modifications in portions of the construction.

The improved device comprises vertical supporting-posts 10 11, erected upon opposite sides of the channel which it is designed to guard, and may be of any size or strength or located any distance apart and will be very firmly embedded in the ground to resist the action of the water.

The fence or gate section consists of longitudinal slats 12 of any suitable length and spaced any required distance apart and preferably of inverted-V shape in cross-section, as represented. The slats 12 are connected at suitable intervals by transverse bars 13, attached, as by spikes or bolts, to their lower sides, and the slats will be inclined at their ends, as at 14 15, to reduce the resistance to the water or drift material passing over them. The lower transverse member 13 is anchored, as by stakes 16 and wire loops or cables 17, to the bed of the stream above the posts 10 11 in position to cause the downstream end of the gate to extend between the posts, as shown, and the upper transverse member extends past the upstream sides of the posts 10 11 to form stops which limit the upward movement of the gate, so that no matter how high the water may rise the gate will not be floated from its position or overturned upon its stakes 16 and will be maintained in position so long as the posts 10 11 retain their places. It will be observed that a single transverse bar is employed for bracing the downstream end of the gate and limiting the upward movement of the same. This is an important feature of the invention and adds materially to the value and efficiency of the device.

Pivoted near one end to the posts 10 11, as at 18, are levers 19 20, connected at their short ends by cable-sections 21 22 to the adjacent member 13 and having weights 23 24 upon their longer ends, as shown. By this simple means the gate is yieldably supported at its downstream end in relatively elongated inclined position and will afford an ample barrier or fence to prevent the passage of cattle, horses, and the like during the period of low water or when the stream is dry and which will also resist movement by a relatively large increase of the water or a comparatively heavy flood, but which will yield in the event of drift material being carried against the gate or fence, or in event of an abnormal rise of water and permit it to pass over, and thus prevent the damage which would otherwise occur. When the drift material passes from the gate it is automatically returned to its former or normal position by the gravity of the weighted levers.

By this simple arrangement of parts it will be noted a simply-constructed and efficient device is constructed which will admirably meet all the requirements of a successful automatic flood fence or gate and which cannot be "floated" from its position by the flooding of the channel, as above described.

It will be noted that the gate when in its elevated position is disposed at a comparatively long or flat incline, so that it offers a slight resistance only to the flowing water and drift material, thus obviating to a large extent all danger of damage to the gate by the blows from the drift material, which would be liable to damage a gate set at steeper or more abrupt incline. Forming the slats in inverted-V shape prevents animals from attempting to pass over the relatively flat gate, as the peculiar shape of the slats renders it difficult to obtain a foothold thereon. The whole thus coacts to produce a very efficient and operative structure which will effectually prevent the passage of animals, while permitting the free passage of water and drift material.

Suitable guard-fences may be employed to shield the levers and weights from the action of the water and drift material; but as these form no part of the present invention and as their construction is so well known they are not shown, as their presence would obscure the parts and detract from the clearness of the illustration.

In Figs. 3 and 4 some slight modifications in the construction are shown consisting in substituting for the weighted levers a cord and weight 25 26 and pulley 27, as in Fig. 3, or a spring 28, as in Fig. 4, it being understood that two of the cords and weights and two of the springs will be employed, one at each side of the gate or at each of the posts 10 11.

Having thus described the invention, what I claim is—

1. In a flood fence and gate, spaced supporting-posts disposed at opposite sides of the channel, a gate formed of longitudinal slats connected by transverse bars, the transverse bars being secured to the bottom of the slats with the bar at the downstream end of the gate extending beyond the posts and bearing against them when the gate is in its elevated position, means for movably connecting the upstream end of the gate to the bed of the channel, and means for yieldably supporting said gate in its elevated position.

2. In a flood fence and gate, spaced supporting-posts disposed at opposite sides of the channel, a gate formed of longitudinal slats connected by transverse bars with the bar at the downstream end of the gate extending laterally beyond said posts and bearing against them when the gate is in its elevated position, weighted levers pivoted to said posts, a flexible connection between the short arms of said levers and the upper transverse bar, and a plurality of flexible loops one end of each of which is secured to the lower transverse bar between the spaced longitudinal slats, the opposite ends of said loops being fastened to the bed of the stream.

In testimony that I claim the foregoing as my own I have hereto affixed my signature in the presence of two witnesses.

JERRY J. JOHNSON.

Witnesses:
GEO. H. ANDERSON,
A. BLUE.